United States Patent Office 3,052,634
Patented Sept. 4, 1962

3,052,634
LOW LOSS, HIGH CURIE TEMPERATURE FERRITES FOR HIGH POWER APPLICATIONS
Milton K. Jack, La Mirada, and Edward T. Wierman, Canoga Park, Calif., assignors to Hughes Aircraft Company, Culver City, Calif., a corporation of Delaware
No Drawing. Filed Nov. 26, 1958, Ser. No. 776,454
4 Claims. (Cl. 252—62.5)

This invention relates to ferrite compositions, particularly those which are suitable for microwave applications, and especially ferrites of the nickel ferrite type.

In certain known applications of ferrites, especially in microwave applications, the ferrites should exhibit low dielectric loss characteristics, low saturation magnetization values, and high Curie temperatures. Various means are known for improving certain of the desired properties of ferrite compositions. These means include modifications in the composition of the ferrite mixture as well as variations in the methods of processing the mixture to produce the finished ferrites. However, ferrites with still more improved and varied ferrimagnetic properties, such as those having a range of low saturation magnetization, low magnetic and low dielectric loss values and a range of high Curie temperatures, are desired.

Some known ferrite materials, although usable over the X-band range, were found not to perform satisfactorily at the high peak power levels employed in certain microwave devices. Other known ferrite materials, although capable of operating at the high peak power levels employed in such microwave devices, did not satisfy the bandwidth requirements because they had a high value of saturation magnetization, a low Curie temperature, or did not provide the maximum value of differential phase shift per unit volume.

Accordingly, it is an important object of this invention to provide a ferrite composition having low loss characteristics for use in wide band microwave devices in the X-band region and subjected to high peak powers of the order of 250 kw. of microwave power.

Another object of this invention is to provide a ferrite composition with a relatively high Curie temperature, a low value of saturation magnetization and the maximum value of differential phase shift per unit volume.

It is another important object of this invention to provide a ferrite composition having low dielectric loss characteristics.

Still another object is to provide a ferrite composition of the nickel ferrite type having improved ferrimagnetic properties.

A further object is to provide a nickel ferrite type ferrimagnetic material having reduced dielectric loss characteristics at microwave frequencies, increased D.C. resistivity and decreased saturation magnetization values.

It has been found that the objects of this invention can be attained by incorporating predetermined amounts of suitable titanium bearing and suitable aluminum bearing materials in the raw material mixture of nickel and iron bearing materials from which the nickel ferrite composition is produced. Ferrite compositions produced from raw material mixtures comprising about 41 to about 50 mol percent nickelous oxide, about 41 to about 49 mol percent of ferric oxide, about 1 to about 13 mol percent of aluminum oxide and about 0.1 to about 5 mol percent titanium dioxide have been discovered to have lower values of saturation magnetization at higher Curie temperatures than known prior art ferrite compositions. In addition, the observed values of gyromagnetic ratio, dielectric loss tangent and resonance linewidth for the ferrite compositions of this invention are more useful in the X-band region than other high Curie temperature ferrite compositions. It was also found that the aluminum and titanium modified nickel ferrites of the invention exhibit no non-linearity as a function of peak microwave powers for power levels below 250° K. peak at 9000 mc., 250 kw. being the maximum available power level. The nickel ferrite compositions of this invention may be expressed in general terms as consisting essentially of about 82 to about 99 mol percent nickel ferrite, about 1 to about 13 mol percent aluminum oxide and about 0.1 to about 5 mol percent titanium dioxide, or by a general formula, such as $Ni_{1.0}Fe_{1.90-x-y}Al_xTi_yO_4$, where $x$ is in the range from about 0.02 to about 0.25 and $y$ is in the range from about 0.002 to about 0.1. Especially suitable ferrite compositions are those in which the value of $x$ is about 0.15 and $y$ is about 0.04. Such especially suitable compositions are prepared from raw material mixtures comprising about 45.5 mol percent nickelous oxide, about 45 mol percent ferric oxide, about 7.5 mol percent aluminum oxide and about 2 mol percent titanium dioxide, and may be considered to consist essentially of about 90.5 mol percent nickel ferrite, about 7.5 mol percent aluminum oxide and about 2 mol percent titanium dioxide.

The ferrite compositions of this invention are believed to be polycrystalline ferrimagnetic materials having an inverse spinel crystal structure, that is, a cubic crystalline structure in which the metal ions are arranged in the crystal lattice in a manner similar to that in crystals of the mineral spinel, $MgAl_2O_4$. It may be desirable for many applications to produce the polycrystalline ferrite compositions of this invention in as dense a form as possible, and thus approach the density of a single crystal of the ferrite. However, it has been found that for some microwave applications somewhat less dense titanium and aluminum modified ferrite compositions may be equally useful, or even preferred. Accordingly, the ferrite compositions of this invention include titanium and aluminum modified polycrystalline nickel ferrites having bulk densities from about 75 to about 99 percent that of the single crystal of the ferrite. In general, if all of the other parameters of the ferrites of this invention are kept constant, ferrimagnetic resonance line widths of these polycrystalline titanium modified nickel ferrite compositions vary with the bulk density of the material, and widen with decreasing bulk density.

Because of their unique, desirable properties, the ferrites of this invention find application in a number of microwave devices, such as microwave gyrators, modulators, isolators, phase shifters, attenuators, duplexers, switches and the like for operation at both high and low RF power levels, particularly where a high Curie temperature ferrite is desired. Other applications of the compositions of the present invention will become apparent from the more detailed description given hereinafter. It will be understood that this more detailed description is not to be construed as limiting the scope of this invention and is given primarily for purposes of illustration and not limitation.

In general, the methods practiced in the art for preparing ferrite compositions, such as nickel ferrites, can be used to prepare a ferrite composition of this invention.

It has been found, for example, that the ferrite compositions of this invention can be satisfactorily prepared by mixing the proper stoichiometric proportions of nickelous oxide NiO, ferric oxide $Fe_2O_3$, aluminum oxide $Al_2O_3$, and titanium dioxide $TiO_2$, as described hereinabove. Distilled water is added to the mixture of oxides and the slurry is wet milled for 24 to 96 hours. After wet milling, the resulting slurry is filtered and the filter cake is dried at 110° C. The dried filter cake is granulated and presintered at temperatures in the range of about 850 to about 1000° C. for a period of about 15 hours. After presintering and cooling, the material is regranulated and sieved. The seived material is vigorously mixed with an aqueous emulsion of a binder and a die lubricant and the resulting slurry is dried at 110° C. The dried mixture is cooled, ground to a desired fine particle size and placed overnight in a humidity chamber containing a moisture-saturated air atmosphere. The humidified mixture is compacted in steel dies using double action pressures of about 4,000 to about 20,000 p.s.i. The resulting compacts are fired in an atmosphere of oxygen in an electric furnace controlled to ensure the slow removal of traces of moisture, volatile impurities and any organic materials, such as binders or die lubricants, which may have been used in forming the compacts. The firing temperature is usually maintained in the range between about 1200° and about 1300° C. for a period of about 2 to 24 hours, depending upon the final properties desired. The cooling rate also should be controlled to ensure obtaining the desired properties in the ferrite composition produced.

The particular details which are preferred for the proper preparation of the aluminum-titanium modified nickel ferrite compositions of this invention are set forth and fully described in the following example. The example is not to be construed as limiting but only by way of illustration.

*Example I*

A mixture of high purity nickelous oxide, ferric oxide, aluminum oxide and titanium dioxide was weighed out according to gram molecular amounts as indicated approximately by the general formula

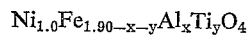

$$Ni_{1.0}Fe_{1.90-x-y}Al_xTi_yO_4$$

$x$ was chosen to be 0.15 and $y$ is 0.04. The amounts weighed out were as follows: NiO—523 grams; $Fe_2O_3$—956 grams; $Al_2O_3$—53 grams, and $TiO_2$—22 grams. This approximately 7 mol charge was wet milled in a 5 qt. steel ball mill jar for 48 hours, using 20 lbs. steel balls and 3500 ml. distilled water. After milling, the balls were screened from the slurry and the finely ground slurry was vacuum filtered and dried at 110° C. The dried filter cake was granulated and sieved to pass a 50 mesh screen and then was pre-fired or presintered for 15 hours at 1800° F. Upon removal from the furnace, it was found that the reddish-brown, non-magnetic mixture of oxides charged to the furnace was changed to a chocolate-brown, magnetic powder. The resulting, presintered cake was easily crushed, and was resieved to pass a 50 mesh screen. The screened material was blended with 2,000 ml. hot distilled water, 30 grams polyvinyl alcohol binder and 7.5 grams magnesium stearate die lubricant in a one gallon Waring Blendor for 30 minutes at low speed. After blending, the slurry was dried in an oven at 110° C. and then ground to pass a 100 mesh screen. Seventy-five gram portions of this powder were exposed overnight to a water vapor saturated atmosphere, and then compacted into bars using a double acting die at a total pressure of 15 tons on a 4 square inch area with a dwell time of 2 to 3 minutes. The resulting compacted bars were supported on 99 percent alumina saggers in a furnace continuously provided with an oxygen atmosphere and fired by heating from room temperature to 540° C. at a rate of rise of 75° C./hour, from 540° C. to 1200° C. at a rate of rise of 115° C./hour, "soaking" for 15 hours at 1200° C. ±5° C., cooling from 1200° C. to 950° C. at 75° C./hour, and then cooling from 950° C. to 200° C. or less at less than 75° C./hour.

Although the example shows the incorporation of titanium and aluminum in the raw material mixture as titanium dioxide and aluminum oxide, it will be understood that any other suitable titanium and aluminum bearing materials, such as metals, alloys, salts, acids, hydroxides, metal-organic compounds, etc., may be used to introduce the desired amount of titanium and aluminum into the raw materials to produce the titanium and aluminum modified ferrite compositions of this invention.

In microwave device applications it is highly desirable that ferrite compositions be as transparent to microwave radiation as practicable. It is also desirable for ferrite compositions to possess as low magnetic loss as practicable for small applied magnetic fields. It is understood that, in achieving low loss in ferrite materials, other properties which contribute to their usefulness in devices operated at microwave frequencies are not to be deleteriously affected. Two convenient and pertinent properties which serve as desirable criteria of performance of a ferrite at microwave frequencies are the microwave transmission phase shift and attenuation as a function of applied D.C. magnetic field. In conjunction with dielectric loss tangent, dielectric constant, saturation magnetization ($4\pi M_s$), gyromagnetic ratio, and the like, an adequate description of the microwave utility of a ferrite material is obtained.

The advantages of the titanium and aluminum modified nickel ferrite compositions of the present invention reside in such desirable properties as the following typical microwave characteristics of materials of this invention obtained in the X-band region:

Gyromagnetic ratio _____ 3.48 megacycles per oersted.
Saturation magnetization ____ 2100 gauss.
Resonance linewidth _____ 600 oersteds.
Curie temperature _____ 520° C.
Dielectric loss tangent _____ .003.
Dielectric constant _____ 11.3.

What is claimed is:
1. A method of making a ferrite composition which comprises preparing an intimate mixture of about 41 to about 50 mol percent nickelous oxide, about 41 to about 49 mol percent ferric oxide, about 1 to about 13 mol percent aluminum oxide and about 0.1 to about 5 mol percent titanium dioxide, and sintering said mixture.

2. A ferrite composition consisting essentially of about 45.5 mol percent nickelous oxide, about 45 mol percent ferric oxide, about 7.5 mol percent aluminum oxide and about 2 mol percent titanium dioxide.

3. A ferrite composition consisting essentially of about 90.5 mol percent nickel ferrite, about 7.5 mol percent aluminum oxide and about 2 mol percent titanium dioxide.

4. The method of making a ferrite composition which comprises the steps of preparing an intimate mixture of about 45.5 mol percent nickelous oxide, about 45 mol percent of ferric oxide, about 7.5 mol percent aluminum oxide and about 2 mol percent titanium oxide, and sintering said mixture.

References Cited in the file of this patent

UNITED STATES PATENTS

| | | |
|---|---|---|
| 2,565,861 | Leverenz et al. | Aug. 28, 1951 |
| 2,576,456 | Harvey et al. | Nov. 27, 1951 |
| 2,640,813 | Berge | June 2, 1953 |

FOREIGN PATENTS

| | | |
|---|---|---|
| 737,284 | Great Britain | Sept. 21, 1955 |
| 754,626 | Great Britain | Aug. 8, 1956 |
| 1,122,258 | France | May 22, 1956 |

OTHER REFERENCES

Gorter: Philips Res. Reports, December 1954, pp. 403–418 and 428–437.

Kordes et al.: Chemical Abstracts, vol. 46, col. 4411, May 25, 1952.